(12) United States Patent
Song et al.

(10) Patent No.: US 12,399,670 B2
(45) Date of Patent: Aug. 26, 2025

(54) ENABLING BIDIRECTIONAL VISUAL COMMUNICATION BETWEEN TWO DEVICES ASSOCIATED WITH A WIRELESS TELECOMMUNICATION NETWORK

(71) Applicant: T-Mobile USA, Inc., Bellevue, WA (US)

(72) Inventors: Jim Joojin Song, Atlanta, GA (US); Eric Foster, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/833,578

(22) Filed: Jun. 6, 2022

(65) Prior Publication Data

US 2023/0393799 A1    Dec. 7, 2023

(51) Int. Cl.
*G06F 3/14* (2006.01)
*G06F 3/0481* (2022.01)
*H04L 65/403* (2022.01)

(52) U.S. Cl.
CPC .......... *G06F 3/1454* (2013.01); *G06F 3/0481* (2013.01); *H04L 65/403* (2013.01)

(58) Field of Classification Search
CPC ................................................. G06F 3/1454
See application file for complete search history.

(56) References Cited

U.S. PATENT DOCUMENTS

| | | | |
|---|---|---|---|
| 8,269,719 B1 * | 9/2012 | Kim | G08C 17/02 345/169 |
| 8,286,084 B2 | 10/2012 | Castleman | |
| 8,405,627 B2 | 3/2013 | Karlsson | |
| 8,493,353 B2 | 7/2013 | Blanchflower et al. | |
| 8,560,004 B1 | 10/2013 | Sipe et al. | |
| 8,674,957 B2 | 3/2014 | Raveendran et al. | |
| 8,692,763 B1 | 4/2014 | Kim | |
| 8,843,963 B2 | 9/2014 | Boylan et al. | |
| 8,924,957 B1 | 12/2014 | Newstadt et al. | |
| 8,977,293 B2 | 3/2015 | Rodriguez et al. | |
| 9,027,117 B2 | 5/2015 | Wilairat | |
| 9,083,610 B2 | 7/2015 | Griff et al. | |
| 9,104,302 B2 | 8/2015 | Chai et al. | |
| 9,161,186 B2 | 10/2015 | Bolton et al. | |
| 9,164,658 B2 | 10/2015 | Sadhvani et al. | |
| 9,219,992 B2 | 12/2015 | Wu | |

(Continued)

FOREIGN PATENT DOCUMENTS

| | | |
|---|---|---|
| CN | 103069849 A | 4/2013 |
| CN | 104704442 A | 6/2015 |

(Continued)

*Primary Examiner* — William Boddie
*Assistant Examiner* — Andrew B Schnirel
(74) *Attorney, Agent, or Firm* — Perkins Coie LLP

(57) ABSTRACT

A device receives from the UE a representation of a first screen associated with the UE and presents the representation of the first screen on a second screen associated with the device. The device creates a first overlay associated with the first screen and a second overlay associated with the second screen. The second overlay is configured to receive an input from a user. The device receives from the second user the input and presents the input in the second overlay. The device sends the input to the UE, which is configured to present the input in the first overlay associated with the first screen.

19 Claims, 7 Drawing Sheets

(56) References Cited

U.S. PATENT DOCUMENTS

| | | | |
|---|---|---|---|
| 9,237,377 B2 | 1/2016 | Bhatia et al. | |
| 9,268,517 B2 | 2/2016 | Privat | |
| 9,280,310 B2 | 3/2016 | Oike | |
| 9,294,914 B2 | 3/2016 | Wilfred et al. | |
| 9,407,861 B2 | 8/2016 | Huenerfauth et al. | |
| 9,424,536 B2 | 8/2016 | Bear et al. | |
| 9,483,584 B2 | 11/2016 | Batra | |
| 9,491,418 B2 | 11/2016 | Iversen et al. | |
| 9,523,977 B2 | 12/2016 | Fuller et al. | |
| 9,529,899 B2 | 12/2016 | Hao et al. | |
| 9,549,059 B2 | 1/2017 | Ross et al. | |
| 9,582,482 B1 | 2/2017 | Sharifi et al. | |
| 9,606,695 B2 | 3/2017 | Matas | |
| 9,628,600 B2 | 4/2017 | Pratt et al. | |
| 9,685,072 B2 | 6/2017 | Patel et al. | |
| 9,690,445 B2 | 6/2017 | Rice et al. | |
| 9,866,999 B1 | 1/2018 | Noeth et al. | |
| 9,942,105 B2 | 4/2018 | Gardner et al. | |
| 9,953,454 B1 | 4/2018 | Rivard et al. | |
| 9,985,786 B1 | 5/2018 | Bhabbur et al. | |
| 10,182,141 B2 | 1/2019 | Paretti et al. | |
| 10,262,382 B2 | 4/2019 | Moore et al. | |
| 11,340,857 B1* | 5/2022 | Smith | G06F 3/1454 |
| 2003/0043179 A1* | 3/2003 | Gusler | G06F 9/453 715/708 |
| 2005/0233733 A1 | 10/2005 | Roundtree et al. | |
| 2007/0116241 A1* | 5/2007 | Flocken | G06Q 30/00 379/265.05 |
| 2010/0156913 A1* | 6/2010 | Ortega | G06F 3/1438 345/520 |
| 2010/0306022 A1 | 12/2010 | Plut | |
| 2011/0115816 A1 | 5/2011 | Brackney | |
| 2012/0089923 A1* | 4/2012 | Pettit | H04N 21/858 715/746 |
| 2013/0050230 A1* | 2/2013 | Jeong | G06F 3/1454 345/522 |
| 2013/0067035 A1 | 3/2013 | Amanat et al. | |
| 2013/0179827 A1 | 7/2013 | Eriksson et al. | |
| 2013/0179837 A1 | 7/2013 | Eriksson et al. | |
| 2014/0033050 A1* | 1/2014 | Shin | H04N 21/4788 715/733 |
| 2014/0267074 A1* | 9/2014 | Balci | G06F 9/451 345/173 |
| 2014/0279584 A1 | 9/2014 | Lee et al. | |
| 2014/0372886 A1 | 12/2014 | Ramasubramanian | |
| 2015/0049681 A1 | 2/2015 | Huang et al. | |
| 2015/0067894 A1* | 3/2015 | Aghara | G06F 16/44 726/30 |
| 2016/0034133 A1 | 2/2016 | Wilson et al. | |
| 2016/0094560 A1* | 3/2016 | Stuntebeck | G06F 3/0481 726/1 |
| 2016/0196584 A1 | 7/2016 | Franklin et al. | |
| 2016/0246466 A1 | 8/2016 | Waddell et al. | |
| 2018/0159979 A1* | 6/2018 | Amir | H04M 3/5183 |
| 2018/0176272 A1 | 6/2018 | Zur et al. | |
| 2018/0333612 A1 | 11/2018 | Davis | |
| 2018/0373885 A1* | 12/2018 | Arad | G06F 21/6254 |
| 2019/0034441 A1 | 1/2019 | Capon | |
| 2019/0053706 A1 | 2/2019 | Martie et al. | |

FOREIGN PATENT DOCUMENTS

| | | |
|---|---|---|
| CN | 104956299 A | 9/2015 |
| CN | 106716324 A | 5/2017 |
| CN | 104584513 B | 12/2017 |
| CN | 107735828 A | 2/2018 |
| CN | 108292190 A | 7/2018 |
| CN | 112512406 A | 3/2021 |
| CN | 113612680 A | 11/2021 |
| DE | 112010005067 T5 | 12/2012 |
| DE | 202015006141 U1 | 12/2015 |
| EP | 2313847 A1 | 4/2011 |
| EP | 2499556 A1 | 9/2012 |
| EP | 2559030 A1 | 2/2013 |
| EP | 2635997 A2 | 9/2013 |
| EP | 2718890 A1 | 4/2014 |
| EP | 2765502 A1 | 8/2014 |
| EP | 2801065 A1 | 11/2014 |
| EP | 2839429 A1 | 2/2015 |
| EP | 2945341 A1 | 11/2015 |
| EP | 3143598 A1 | 3/2017 |
| EP | 3179355 A1 | 6/2017 |
| EP | 3210137 A2 | 8/2017 |
| EP | 2785026 B1 | 5/2018 |
| EP | 3337583 A1 | 6/2018 |
| EP | 3414924 A1 | 12/2018 |
| EP | 3449398 A1 | 3/2019 |
| EP | 3453169 A1 | 3/2019 |
| EP | 3510542 A1 | 7/2019 |
| EP | 3857481 A1 | 8/2021 |
| JP | 2013509644 A | 3/2013 |
| JP | 2015043199 A | 3/2015 |
| JP | 2015210631 A | 11/2015 |
| JP | 6102016 B2 | 3/2017 |
| JP | 6445464 B2 | 12/2018 |
| JP | 6461562 B2 | 1/2019 |
| JP | 2019501465 A | 1/2019 |
| JP | 6497002 B2 | 3/2019 |
| KR | 20110086622 A | 7/2011 |
| KR | 101065644 B1 | 9/2011 |
| KR | 101431397 B1 | 8/2014 |
| KR | 20160042289 A | 4/2016 |
| KR | 20170000196 A | 1/2017 |
| KR | 20180028855 A | 3/2018 |
| KR | 101886608 B1 | 8/2018 |
| KR | 20180109631 A | 10/2018 |
| KR | 20180116731 A | 10/2018 |
| KR | 101939806 B1 | 1/2019 |
| KR | 20190021141 A | 3/2019 |
| WO | 2009120925 A2 | 10/2009 |
| WO | 2014088472 A1 | 6/2014 |
| WO | 2014149643 A1 | 9/2014 |
| WO | 2014183458 A1 | 11/2014 |
| WO | 2015112108 A1 | 7/2015 |
| WO | 2015162550 A1 | 10/2015 |
| WO | 2015173653 A2 | 11/2015 |
| WO | 2015187861 A1 | 12/2015 |
| WO | 2016144255 A1 | 9/2016 |
| WO | 2017095800 A1 | 6/2017 |
| WO | 2017213937 A1 | 12/2017 |
| WO | 2017218192 A1 | 12/2017 |
| WO | 2017221659 A1 | 12/2017 |
| WO | 2018144051 A1 | 8/2018 |
| WO | 2018209152 A1 | 11/2018 |
| WO | 2018213506 A2 | 11/2018 |
| WO | 2018222756 A1 | 12/2018 |

\* cited by examiner

ENABLING BIDIRECTIONAL VISUAL COMMUNICATION BETWEEN TWO DEVICES ASSOCIATED WITH A WIRELESS TELECOMMUNICATION NETWORK

BACKGROUND

When mobile device users experience issues and call customer service, the effectiveness of the customer service is limited because the customer service cannot see the mobile device screen and does not have physical possession of the mobile device. Consequently, the help provided by the customer service can be inefficient, and the resolution of the problem can take a while.

BRIEF DESCRIPTION OF THE DRAWINGS

Detailed descriptions of implementations of the present invention will be described and explained through the use of the accompanying drawings.

Figure 1:
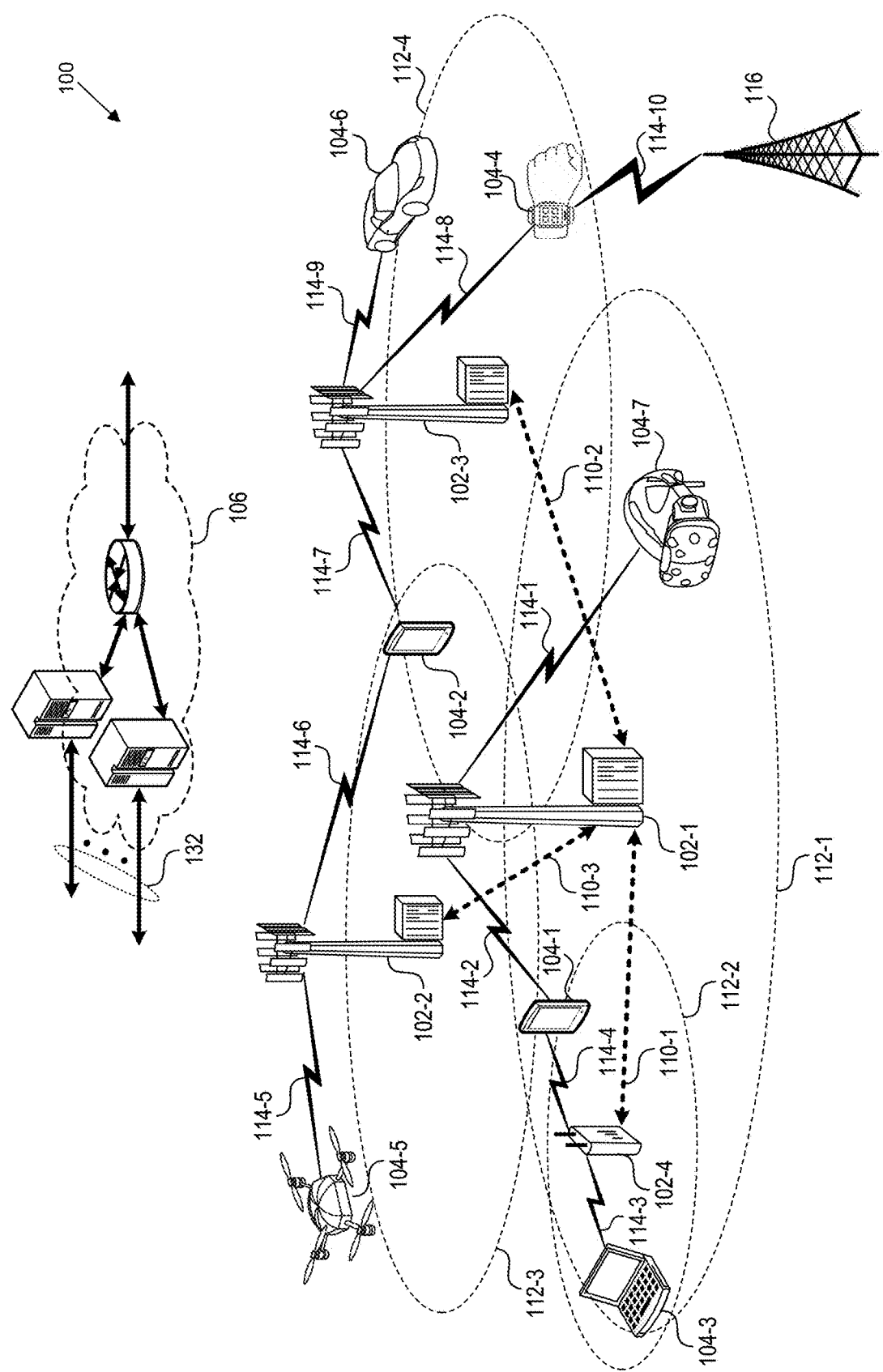
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to enable bidirectional visual communication between a mobile devices A and a device B, both associated with the same wireless telecommunication network. Device B can be a mobile device, a desktop computer, a laptop computer, a tablet, etc., associated with the wireless telecommunication network that enables an operator to access the wireless telecommunication network and to communicate with the mobile device A.

The system can receive an indication that a user associated with the mobile device A is experiencing an issue. The device B receives from the mobile device A a representation of a screen A associated with the mobile device A. The representation can show operating system settings and/or device settings associated with the mobile device A. The system can present the representation of the screen A associated with the mobile device A on a screen B associated with the device B.

The system can create an overlay A associated with the screen A and an overlay B associated with the screen B. The overlay A can include a transparent image A fitted over the screen A, while the overlay B can include a transparent image B fitted over the screen B. The overlay B can be configured to receive an input from a user. The input can be textual or visual, such as enclosing a user interface element shown on the screen A.

The system can receive from the user the input. The system can present the input in the overlay B associated with the screen B, where the input is visible on top of the screen B. The system can send the input to the mobile device A, which is configured to present the input in the overlay A associated with the screen A. The mobile device A can present the input and so guide the user of the mobile device A in resolving the issue.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs, including an access point, radio transceiver, gNodeB (gNB), NodeB, eNodeB (eNB), Home NodeB or Home eNodeB, or the like. In addition to being a wireless wide area network (VVWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "geographic coverage area 112" or collectively as "geographic coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNBs is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. A small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively small geographic area and can allow unrestricted access by wireless devices that have service subscriptions with the network 100 provider. A femto cell covers a relatively small geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Figure 2:
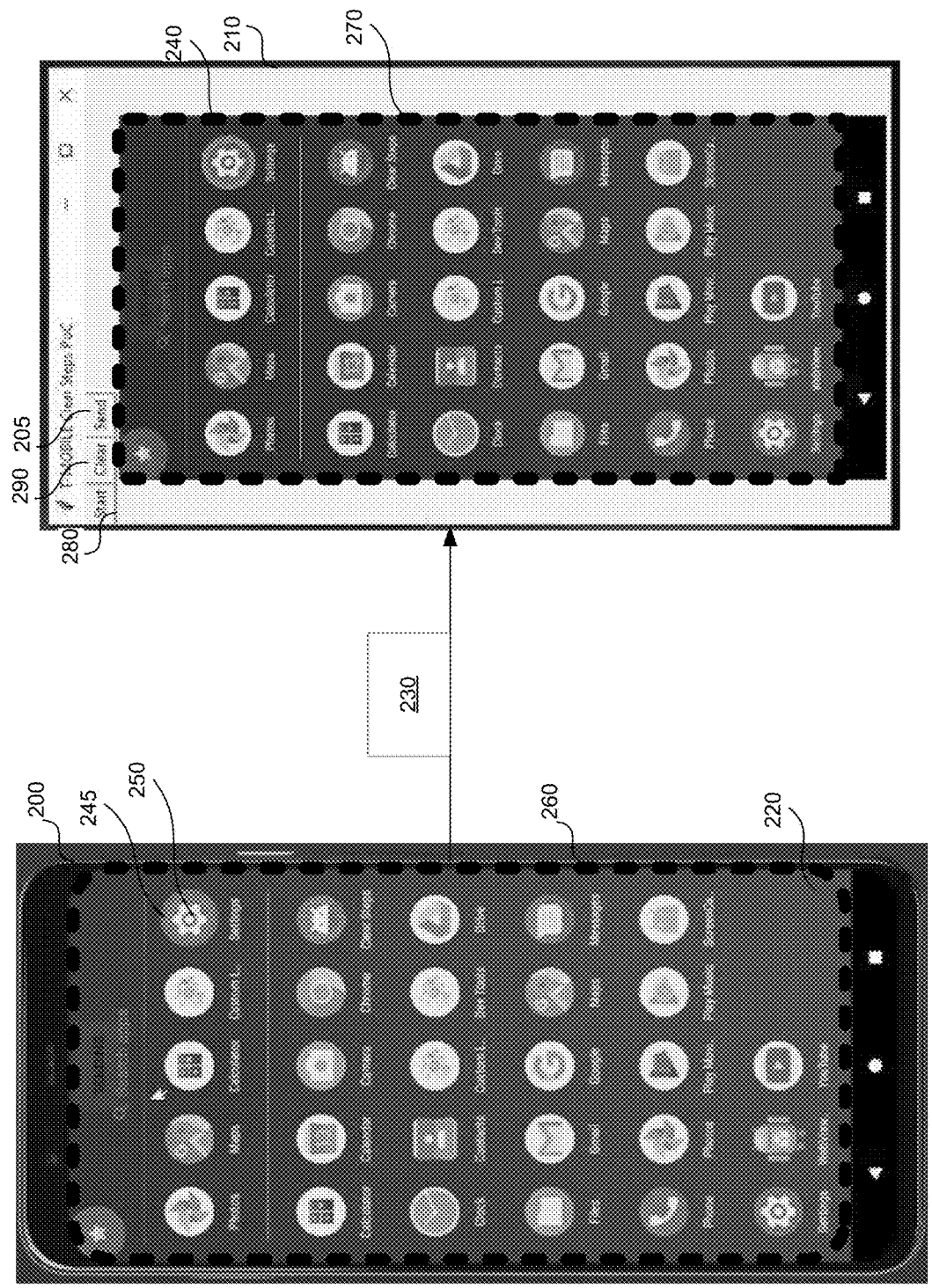
FIG. 2 shows bidirectional visual communication between two devices.

Enabling Bidirectional Visual Communication Between Two Devices Associated with a Wireless Telecommunication Network FIG. 2 shows bidirectional visual communication between two devices. The first device 200 can be a user equipment (UE), such as a mobile phone, associated with a wireless telecommunication network 100 in FIG. 1 such as a 3G, 4G, 5G, or 6G network. The user of the first device 200 can be experiencing technical issues such as a problem configuring an embedded SIM (eSIM) card on the first device. The user may need to contact a customer assistance operator, such as a person or an artificial intelligence (AI), for help. The customer assistance operator can operate the second device 210.

To help resolve the issues associated with the first device 200, the first device 200 can share the screen 220 of the first device, so that the operator can identify the problem and visually guide the user of the first device. The first device 200 can share only a selected element such as the full screen, only a certain application associated with the first device, and/or the operating system settings associated with the first device. In addition, the user can specify a time in which to share the screen, so that the first device 200 does not continuously stream the selected elements to the second device 210. Once the first device 200 sends the representation of the screen 230 to the second device 210, the second device 210 displays the representation of the screen 230 on the second device, and the first device and the second device can see the same view.

The operator of the second device 210 can then visually guide the user of the first device 200 by, for example, creating a visual indicator 240 pointing out which user interface element 250 to select. To create the visual indicator 240, 245, the first device 200 and the second device 210 can create a first overlay 260 and a second overlay 270, which are fitted over the screens of the devices 200, 210. The first overlay 260 can be the size of the screen of the first device 200, while the second overlay 270 can be the size of the screen of the second device 210. The devices 200, 210 can have different sizes. The overlays 260, 270 can be transparent, and only the visual indicator 240 can be visible.

To initiate the screen sharing and the creation of the overlays 260, 270, the operator can select the user element 280. Upon creating the visual indicator 240, the operator can select the user element 290 to communicate the visual indicator 240 to the second overlay 270. Consequently, the first device 200 can display the corresponding visual indicator 245. The operator can create one or more visual indicators 240. To remove the visual indicators 240, 245 from the first and second overlays 260, 270, the operator can select the user interface element 205.

Figure 3:
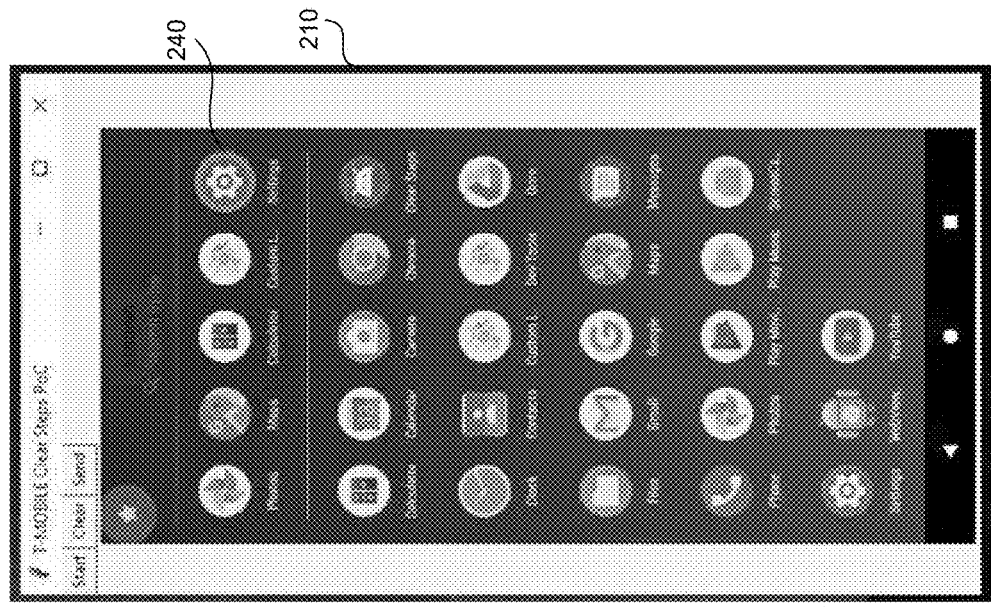
FIG. 3 shows presenting additional instruction using picture-in-picture technology.
Figure 3:
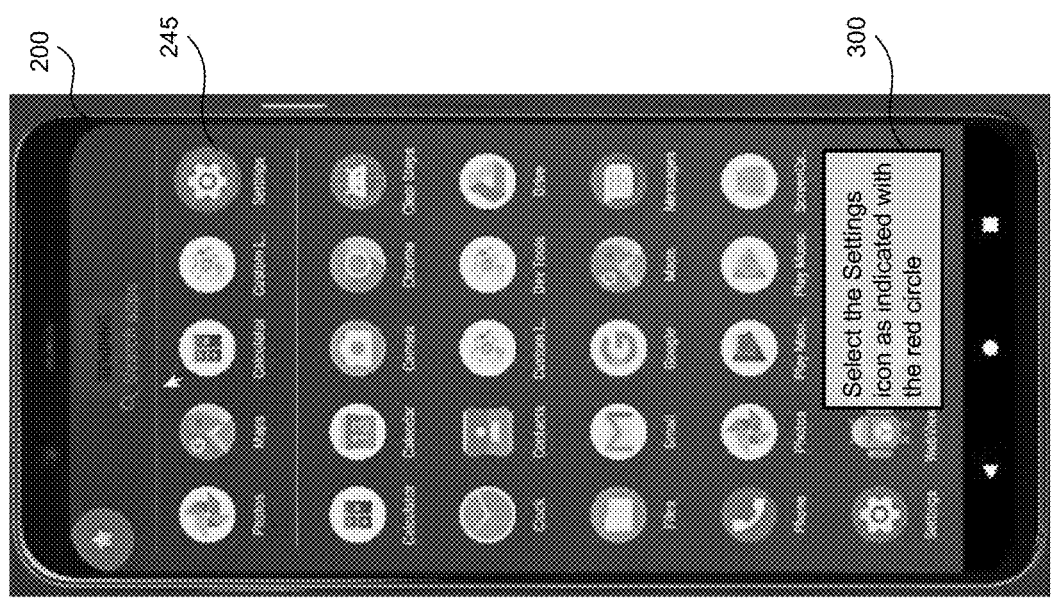

FIG. 3 shows presenting additional instruction using picture-in-picture technology. In addition to providing the visual indicator 240, 245, the second device 210 sometimes needs to provide additional instruction to the first device 200. For example, the user of the first device 200 could be hard of hearing and might better understand textual instruction as opposed to audio instruction. In addition to or instead of providing the visual indicator 240, 245, the second device 210 can provide additional instruction 300 to the first device 200, further instructing the user how to resolve the issue. The additional instruction 300 can be textual instruction, as seen in FIG. 3, or it can be another image or an explanatory video. To create the additional instruction 300, the second device 210 can utilize picture-in-picture software development kit (SDK), which is available on Android, iPhones, or other mobile devices.

Figure 4:
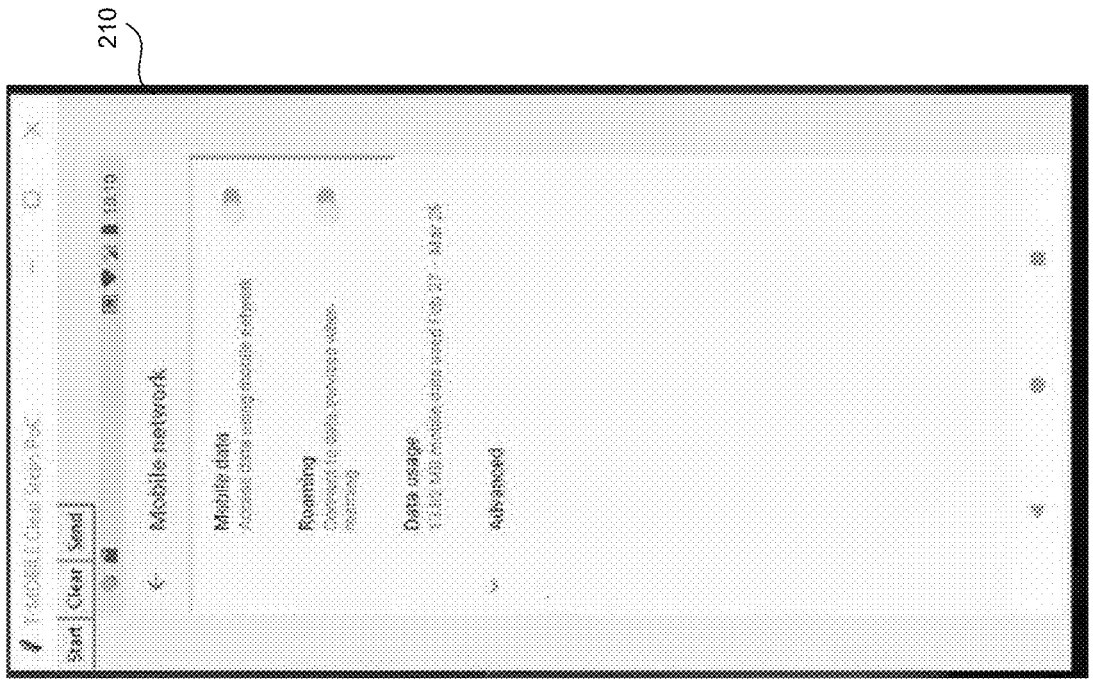
FIG. 4 shows sharing of operating system settings between two devices.
Figure 4:
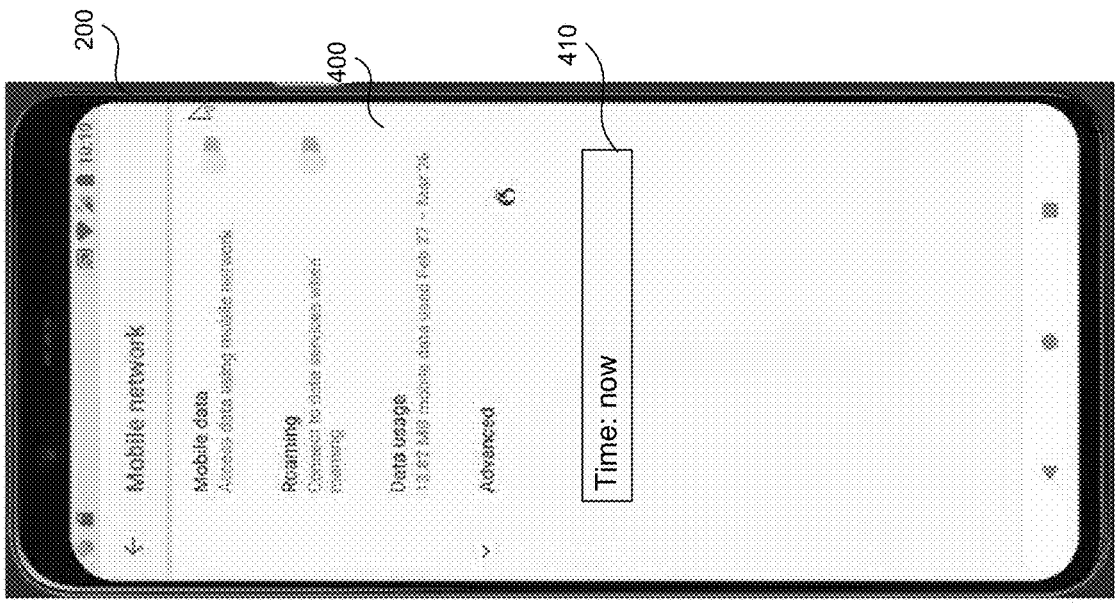

FIG. 4 shows sharing of operating system settings between two devices. The disclosed technology can enable the first device 200 to share with the second device 210 the device configuration settings and/or the operating system settings 400 associated with the first device 200. While sharing the screen generated by an application can be easily done, most systems do not support sharing the device configuration settings and/or the operating system settings 400 as shown in FIG. 4 because operating system settings are normally protected and require additional permissions.

For security reasons, the user can specify a time 410 at which to share the settings 400. The time 410 can be instantaneous, as shown in FIG. 4, or can include a time period. Once the current time is outside the specified time 410, the first device 200 can stop sharing the screen.

Figure 5:
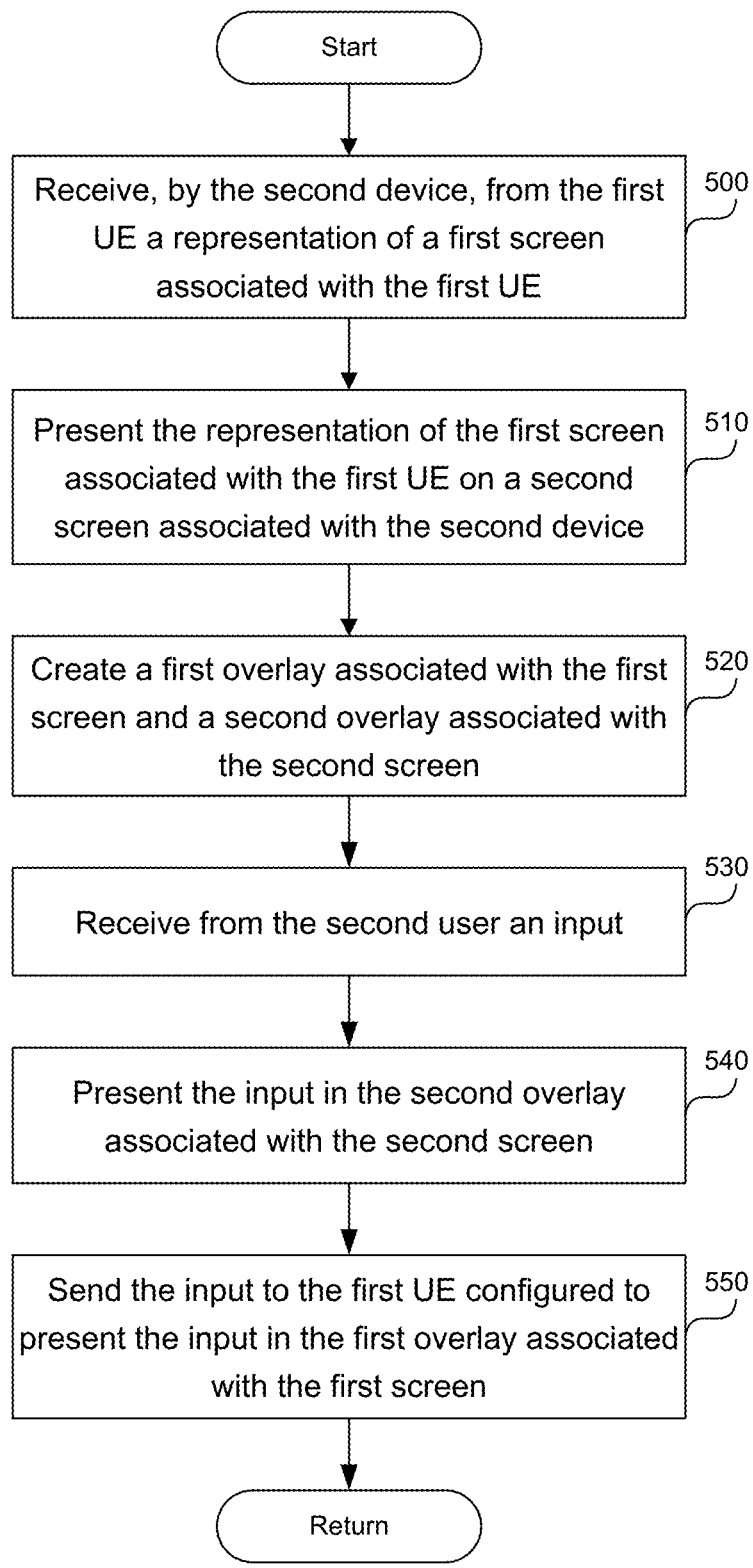
FIG. 5 is a flowchart of a method to enable bidirectional visual communication between a first UE associated with a wireless telecommunication network and a second device associated with the wireless telecommunication network.

FIG. 5 is a flowchart of a method to enable bidirectional visual communication between a first UE associated with a wireless telecommunication network and a second device associated with the wireless telecommunication network. In step 500, a hardware or software processor executing instructions described in this application can cause the second device to receive, from the first UE a representation of a first screen associated with the first UE. The representation can show operating system settings associated with the first UE or an application associated with the first UE.

In step 510, the processor can present the representation of the first screen associated with the first UE on a second screen associated with the second device. The second device can be an electronic device such as a laptop computer, a desktop computer, or a UE associated with an operator of the network 100 in FIG. 1.

In step 520, the processor can create a first overlay associated with the first screen and a second overlay associated with the second screen, where the first overlay includes a first transparent image fitted over the first screen and the second overlay includes a second transparent image fitted over the second screen. The second overlay is configured to receive an input from a second user. The input can be textual or visual, such as a circle. Also, the processor can receive the first screen, and create a composite of the received first screen from the first UE and the currently displayed second screen at the second device, with a delta between the two highlighted or otherwise emphasized. For example, the processor can gray out the visual elements between the first and second screens that are the same. The processor can share the composite with the first UE and the second device.

In step 530, the processor can receive from the second user an input. In step 540, the processor can present the input in the second overlay associated with the second screen, where the input is visible on top of the second screen associated with the second device.

In step 550, the processor can send the input to the first UE, which is configured to present the input in the first overlay associated with the first screen. When presented to the first user, the input can guide the first user to resolve a technical issue with the UE.

The processor can share a specific application or a whole screen of the first UE indefinitely, or for a specified period of time, without streaming. The processor can receive an indication of time during which to share the representation associated with the first screen. The indication of time can be instantaneous or can be a period of time. The processor can obtain a current time. The processor can determine whether the current time is outside the indication of time during which to share the representation. Upon determining that the current time is within the indication of time during which to share the representation, the processor can cause the first UE to send the representation of the first screen associated with the first UE to the second device. Upon determining that the current time is outside the indication of time during which to share the representation, the processor can cause the first UE to refrain from sending the representation of the first screen associated with the first UE.

The processor can create a picture-in-picture textual instruction and/or graphical instruction, which can be useful if the user is hard of hearing or has trouble following audio instructions. The processor can receive an indication that a first user associated with the first device is experiencing an issue, such as an issue with configuring an eSIM. Upon receiving the representation of the first screen associated with the first UE, the processor can generate a visual representation including instructions indicating how to resolve the issue. The visual representation can include text for hard-of-hearing clients. The processor can send the visual representation to the first UE. The processor can cause the first UE to present the visual representation on a first portion of the first screen, where the first portion of the first screen does not obscure a second portion of the first screen needed to follow the instructions.

The processor can automatically position the visual representation to not obscure the second portion of the first screen. In addition, the processor can cause the first UE to receive a second input from the first user indicating to relocate the visual representation. For example, the user may want to relocate the visual presentation because the picture-in-picture is obscuring an important part of the screen. The processor can cause the first UE to relocate the visual representation based on the second input from the first user.

The processor can utilize AI to provide automated guidance to the user seeking assistance. The processor can analyze the representation of the first screen associated with the first UE. To analyze the representation of the first screen, the processor can retrieve from a database multiple screens and multiple solutions, where a screen among the multiple screens is associated with a solution among multiple solutions. The solution can be a solution to the issue that the user is experiencing when sharing the particular screen. To further analyze the representation of the first screen, the processor can select among the multiple screens a third screen that is most similar to the first screen. The processor can measure a similarity between screens based on similarity of texts displayed on the screens or similarity of icons displayed on the screens. The processor can identify a third solution associated with the third screen. The processor can provide the third solution to the first UE.

The processor can store the solutions in a database for future reference. The processor can receive an indication that a first user associated with the first device is experiencing an issue. The processor can receive an indication that the issue has been resolved and an indication of a solution of the issue. The processor can store the indication of the solution of the issue and at least one of the first overlay or the second overlay. In addition, the processor can store a description of the issue associated with the screen.

The processor can remove overlays after the connection between the first UE and the second device is closed. The processor can store the overlays in a database for future reference. The processor can receive an indication to end a communication between the first UE and the second device. The processor can remove the first overlay associated with the first screen and the second overlay associated with the second screen. The processor can store at least one of the first overlay or the second overlay. In addition, the processor can store a description of the issue associated with the overlay.

Figure 6:
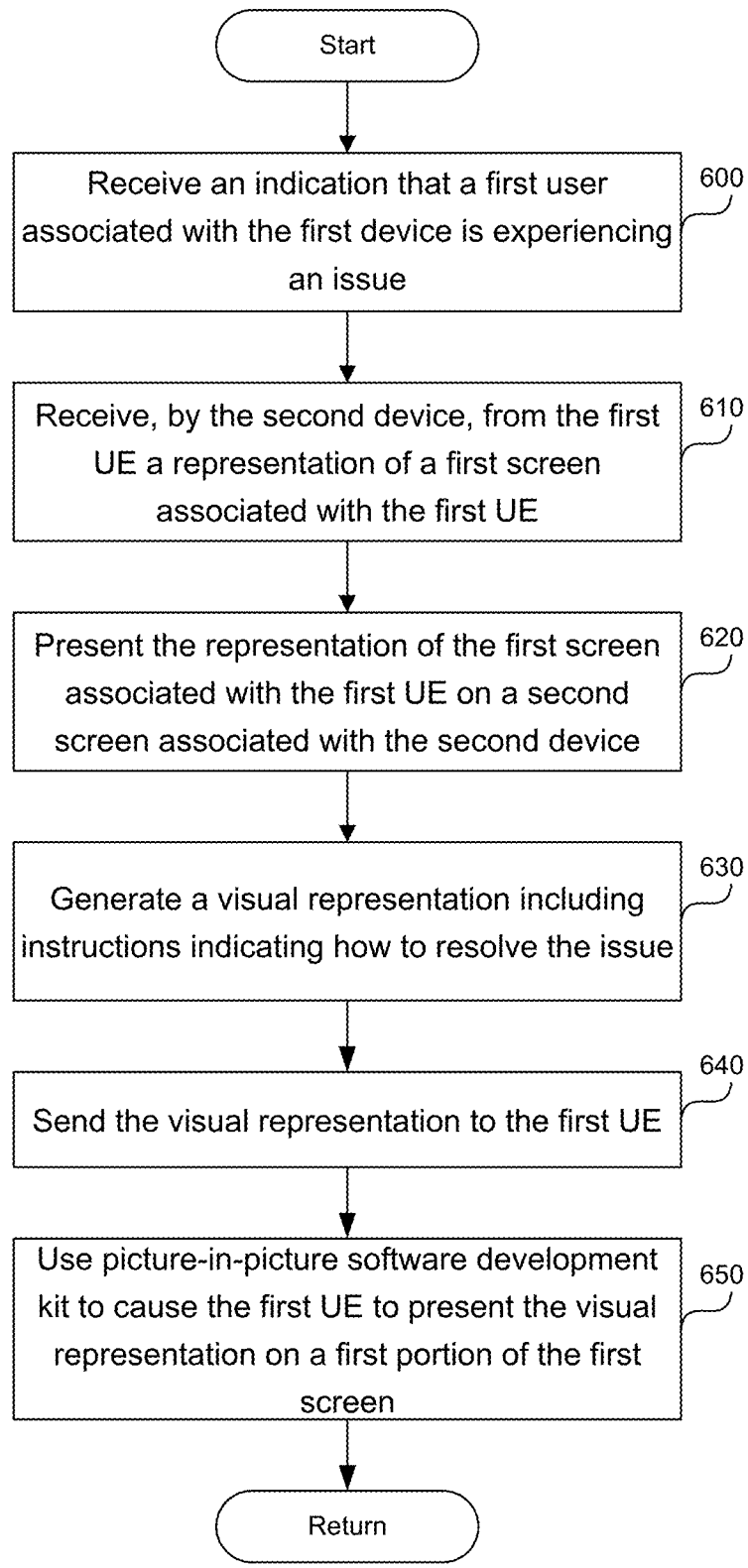
FIG. 6 is a flowchart of a method to present additional instruction using picture-in-picture technology.

FIG. 6 is a flowchart of a method to present additional instruction using picture-in-picture technology. A processor can use a picture-in-picture software development kit to provide additional instruction to a user seeking assistance, such as a user that has difficulty following verbal instructions.

In step 600, a processor can receive an indication that a first user associated with the first UE is experiencing an issue, such as an issue configuring the first device to use an eSIM.

In step 610, the processor can cause the second device to receive, from the first UE a representation of a first screen associated with the first UE. In step 620, the processor can present the representation of the first screen associated with the first UE on a second screen associated with the second device.

In step 630, the processor can generate a visual representation including instructions indicating how to resolve the issue. The instructions can be textual or visual, such as a video, and can help users having difficulty following verbal instructions, such as hearing-impaired users.

In step 640, the processor can send the visual representation to the first UE. In step 650, the processor can use a picture-in-picture software development kit to cause the first UE to present the visual representation on a first portion of the first screen. The visual presentation can obscure the first portion of the first screen. In other words, the visual representation can be opaque and can be overlaid over the first portion of the screen. The processor can position the visual representation on the screen so that the first portion of the first screen does not obscure a second portion of the first screen needed to follow the instructions.

The processor can present the representation of the first screen associated with the first UE on a second screen associated with the second device. The processor can create a first overlay associated with the first screen and a second overlay associated with the second screen. The first overlay can include a first transparent image fitted over the first screen, while the second overlay can include a second transparent image fitted over the second screen. In other words, the first overlay can be the same size as the first screen, while the second overlay can be the same size as the second screen. The first overlay and the second overlay can be different sizes. The second overlay can be configured to receive an input from a second user. The input can be textual or visual, such as enclosing or highlighting a portion of the screen. The processor can receive from the second user the input, such as a visual or an alphanumeric input. The processor can present the input in the second overlay associated with the second screen, where the input is visible on top of the second screen associated with the second device. The processor can send the input to the first UE, which is configured to present the input in the first overlay associated with the first screen. The first UE can present the input on the first screen and the user of the first UE.

The processor can enable the user to select the whole screen, a portion of the screen, or a particular application associated with the first UE to share. In addition, the processor can enable the user to select a time, such as a time instant or a period of time during which to share the UE.

Consequently, the processor can share the first screen without streaming the first screen, instead sharing the first screen only at the specified time.

To share the screen without streaming, the processor can receive an indication of time during which to share the representation associated with the first screen. The processor can obtain a current time. The processor can determine whether the current time is outside the indication of time during which to share the representation. Upon determining that the current time is within the indication of time during which to share the representation, the processor can cause the first UE to send the representation of the first screen associated with the first UE to the second device. Upon determining that the current time is outside the indication of time during which to share the representation, the processor can cause the first UE to refrain from sending the representation of the first screen associated with the first UE.

The processor can create a picture-in-picture textual and/or graphical instruction, which can be helpful when the user is hard of hearing or has trouble following instructions. The processor can cause the first UE to present the visual representation on a first portion of the first screen. The processor can cause the first UE to receive a second input from the first user indicating to relocate the visual representation because, for example, the picture-in-picture is obscuring an important part of the first screen. The processor can cause the first UE to relocate the visual representation based on the second input from the first user.

The processor can send screen captures to machine learning models that can provide automated guidance to the user. The processor can analyze the representation of the first screen associated with the first UE. To analyze the first screen, the processor can retrieve from a database multiple screens and multiple solutions, where a screen among the multiple screens is associated with a solution among multiple solutions. To further analyze the screen, the processor can identify among the multiple screens a third screen that is most similar to the first screen. The processor can measure the similarity between screens by measuring similarity of texts or similarity of icons displayed on the screens. The processor can identify a third solution associated with the third screen. The processor can provide the third solution to the first UE.

The processor can store solutions in a database for future reference. The processor can receive an indication that the issue has been resolved and an indication of a solution of the issue. The processor can store the indication of the solution of the issue and at least one of the first overlay or the second overlay. The processor can also store the issue that the user was experiencing when sharing the screen.

Computer System

Figure 7:
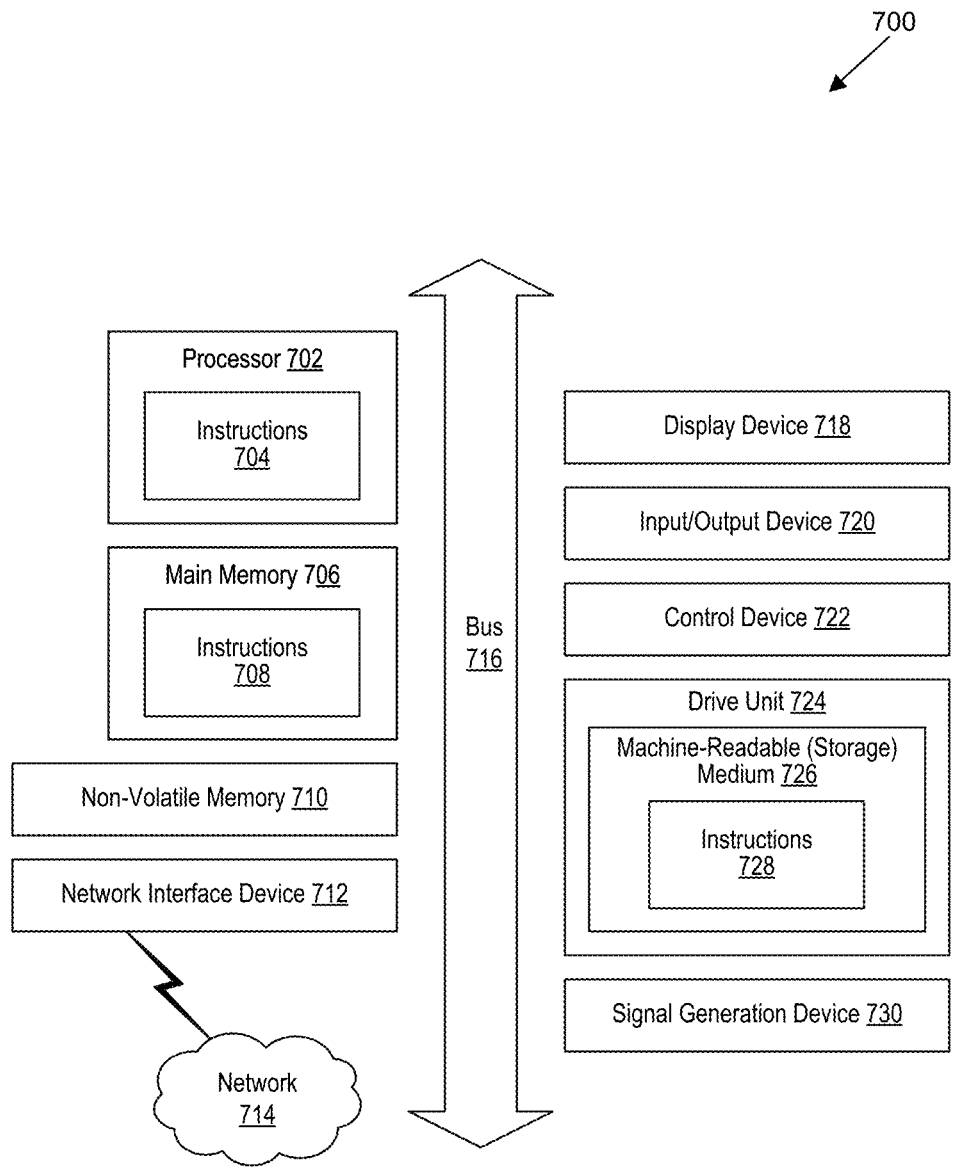
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the Figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system, such as a mesh of computer systems, or include one or more cloud components in one or more networks. Where appropriate, one or more computer systems 700 can perform operations in real time, near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable (storage) medium 726) can be local, remote, or distributed. Although shown as a single medium, the machine-readable (storage) medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

REMARKS

The terms "example," "embodiment," and "implementation" are used interchangeably. For example, references to "one example" and "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals and carrying instructions to enable bidirectional visual communication between a first mobile device associated with a wireless telecommunication network and a second device associated with the wireless telecommunication network, which, when executed by at least one data processor of a system, cause the system to:
receive, by the second device, from the first mobile device a representation of a first screen associated with the first mobile device,
wherein the first screen indicates a technical issue experienced by the first mobile device,
wherein the representation shows operating system settings of the first mobile device, the operating system settings controlling operations of one or more systems of the first mobile device and related to a cause of the technical issue;
present the representation of the first screen associated with the first mobile device on a second screen associated with the second device;
create a first overlay associated with the first screen and a second overlay associated with the second screen, wherein the first overlay includes a first transparent image fitted over the first screen,
wherein the second overlay includes a second transparent image fitted over the second screen, and
wherein the second overlay is configured to receive an input from a second user;
obtain a solution associated with the technical issue experienced by the first mobile device by:
retrieving, from a database, multiple screens associated with multiple solutions of multiple technical issues previously experienced by multiple mobile devices operating on the wireless telecommunication network,
wherein the multiple screens show operating system settings of the multiple mobile devices during the multiple technical issues, the operating system settings controlling operations of one or more systems of the multiple mobile devices and related to causes of the multiple technical issues;
among the multiple screens, determining a third screen most similar to the first screen by measuring similarity of an icon displayed on the first screen and an icon displayed on the third screen;
obtaining a solution among the multiple solutions associated with the third screen,
wherein the solution among the multiple solutions associated with the third screen includes the solution associated with the technical issue experienced by the first mobile device,
wherein the solution associated with the technical issue experienced by the first mobile device comprises an adjustment to the operating system settings of the first mobile device;
receive from the second user the input,
wherein the input is based on the obtained solution associated with the technical issue experienced by the first mobile device and includes a visual or an alphanumeric input configured to assist a first user of the first mobile device with the technical issue experienced by the first mobile device;
present the input in the second overlay associated with the second screen,
wherein the input is visible on top of the second screen associated with the second device; and
send the input to the first mobile device configured to present the input in the first overlay associated with the first screen.

2. The at least one computer-readable storage medium of claim 1, comprising instructions to:
receive an indication of time during which to share the representation of the first screen associated with the first mobile device;
obtain a current time;
determine whether the current time is outside the indication of time during which to share the representation;
upon determining that the current time is within the indication of time during which to share the representation, cause the first mobile device to send the representation of the first screen associated with the first mobile device to the second device; and
upon determining that the current time is outside the indication of time during which to share the representation, cause the first mobile device to refrain from sending the representation of the first screen associated with the first mobile device.

3. The at least one computer-readable storage medium of claim 1, comprising instructions to:
receive an indication that the first user associated with the first mobile device is experiencing the technical issue;
upon receiving the representation of the first screen associated with the first mobile device, generate a visual representation including instructions indicating how to resolve the technical issue;
send the visual representation to the first mobile device; and
cause the first mobile device to present the visual representation on a first portion of the first screen,
wherein the first portion of the first screen does not obscure a second portion of the first screen needed to follow the instructions indicating how to resolve the technical issue.

4. The at least one computer-readable storage medium of claim 1, comprising instructions to:
receive an indication that the first user associated with the first mobile device is experiencing the technical issue;
upon receiving the representation of the first screen associated with the first mobile device, generate a visual representation including instructions indicating how to resolve the technical issue;
send the visual representation to the first mobile device;
cause the first mobile device to present the visual representation on a first portion of the first screen;
cause the first mobile device to receive a second input from the first user indicating to relocate the visual representation; and
cause the first mobile device to relocate the visual representation based on the second input from the first user.

5. The at least one computer-readable storage medium of claim 1, comprising instructions to:
receive an indication that the first user associated with the first mobile device is experiencing the technical issue, an indication that the technical issue has been resolved, and an indication of a solution of the technical issue; and
store the indication of the solution of the technical issue and at least one of the first overlay or the second overlay.

6. The at least one computer-readable storage medium of claim 1, comprising instructions to:
receive an indication to end a communication between the first mobile device and the second device;
remove the first overlay associated with the first screen and the second overlay associated with the second screen; and
store at least one of the first overlay or the second overlay.

7. A system comprising:
at least one hardware processor; and
at least one non-transitory memory storing instructions, which, when executed by the at least one hardware processor, cause the system to:
receive, by a second device, from a first user equipment (UE) a representation of a first screen associated with the first UE,
wherein the first screen indicates a technical issue experienced by the first UE,
wherein the representation shows operating system settings of the first UE, the operating system settings controlling operations of one or more systems of the first UE and related to a cause of the technical issue;
present the representation of the first screen associated with the first UE on a second screen associated with the second device;

create a first overlay associated with the first screen and a second overlay associated with the second screen,
wherein the first overlay includes a first transparent image fitted over the first screen,
wherein the second overlay includes a second transparent image fitted over the second screen, and
wherein the second overlay is configured to receive an input from a second user;
obtain a solution associated with the technical issue experienced by the first UE by:
retrieving, from a database, multiple screens associated with multiple solutions of multiple technical issues previously experienced by multiple UEs,
wherein the multiple screens show operating system settings of the multiple UEs during the multiple technical issues, the operating system settings controlling operations of one or more systems of the multiple UEs and related to causes of the multiple technical issues;
among the multiple screens, determining a third screen most similar to the first screen by measuring similarity of an icon displayed on the first screen and an icon displayed on the third screen;
obtaining a solution among the multiple solutions associated with the third screen,
wherein the solution among the multiple solutions associated with the third screen includes the solution associated with the technical issue experienced by the first UE,
wherein the solution associated with the technical issue experienced by the first UE comprises an adjustment to the operating system settings of the first UE;
receive from the second user the input,
wherein the input is based on the obtained solution associated with the technical issue experienced by the first UE and includes a visual or an alphanumeric input configured to assist a first user of the first UE with the technical issue experienced by the first UE;
present the input in the second overlay associated with the second screen, wherein the input is visible on top of the second screen; and
send the input to the first UE configured to present the input in the first overlay associated with the first screen.

8. The system of claim 7, comprising instructions to:
receive an indication of time during which to share the representation of the first screen associated with the first UE;
obtain a current time;
determine whether the current time is outside the indication of time during which to share the representation;
upon determining that the current time is within the indication of time during which to share the representation, cause the first UE to send the representation of the first screen associated with the first UE to the second device; and
upon determining that the current time is outside the indication of time during which to share the representation, cause the first UE to refrain from sending the representation of the first screen associated with the first UE.

9. The system of claim 7, comprising instructions to:
receive an indication that the first user associated with the first UE is experiencing the technical issue;
upon receiving the representation of the first screen associated with the first UE, generate a visual representation including instructions indicating how to resolve the technical issue;
send the visual representation to the first UE; and
cause the first UE to present the visual representation on a first portion of the first screen,
wherein the first portion of the first screen does not obscure a second portion of the first screen needed to follow the instructions indicating how to resolve the technical issue.

10. The system of claim 7, comprising instructions to:
receive an indication that the first user associated with the first UE is experiencing the technical issue;
upon receiving the representation of the first screen associated with the first UE, generate a visual representation including instructions indicating how to resolve the technical issue;
send the visual representation to the first UE;
cause the first UE to present the visual representation on a first portion of the first screen;
cause the first UE to receive a second input from the first user indicating to relocate the visual representation; and
cause the first UE to relocate the visual representation based on the second input from the first user.

11. The system of claim 7, comprising instructions to:
analyze the representation of the first screen associated with the first UE by:
retrieving from a database multiple screens and multiple solutions,
wherein a screen among the multiple screens is associated with a solution among the multiple solutions; and
identifying among the multiple screens a third screen that is most similar to the first screen;
identify a third solution associated with the third screen; and
provide the third solution to the first UE.

12. The system of claim 7, comprising instructions to:
receive an indication that the first user associated with the first UE is experiencing the technical issue, an indication that the issue has been resolved, and an indication of a solution of the technical issue; and
store the indication of the solution of the technical issue and at least one of the first overlay or the second overlay.

13. The system of claim 7, comprising instructions to:
receive an indication to end a communication between the first UE and the second device;
remove the first overlay associated with the first screen and the second overlay associated with the second screen; and
store at least one of the first overlay or the second overlay.

14. A system comprising:
at least one hardware processor; and
at least one non-transitory memory storing instructions, which, when executed by the at least one hardware processor, cause the system to:
receive an indication that a first user associated with a first user equipment (UE) is experiencing a technical issue;
receive, by a second device, from the first UE a representation of a first screen associated with the first UE,
wherein the first screen indicates the technical issue experienced by the first UE, wherein the representation shows operating system settings of the first UE, the operating system settings controlling operations of one or more systems of the first UE and related to a cause of the technical issue;
present the representation of the first screen associated with the first UE on a second screen associated with the second device;
obtain a solution associated with the technical issue experienced by the first UE by:
retrieving, from a database, multiple screens associated with multiple solutions of multiple technical issues previously experienced by multiple UEs,
wherein the multiple screens show operating system settings of the multiple UEs during the multiple technical issues, the operating system settings controlling operations of one or more systems of the multiple UEs and related to causes of the multiple technical issues;
among the multiple screens, determining a third screen most similar to the first screen by measuring similarity of an icon displayed on the first screen and an icon displayed on the third screen;
obtaining a solution among the multiple solutions associated with the third screen,
wherein the solution among the multiple solutions associated with the third screen includes the solution associated with the technical issue experienced by the first UE,
wherein the solution associated with the technical issue experienced by the first UE comprises an adjustment to the operating system settings of the first UE;
generate a visual representation including instructions indicating how to resolve the technical issue,
wherein the visual representation is based on the obtained solution associated with the technical issue experienced by the first UE and;
send the visual representation to the first UE; and
use a picture-in-picture software development kit to cause the first UE to present the visual representation on a first portion of the first screen,
wherein the visual presentation obscures the first portion of the first screen, and
wherein the first portion of the first screen does not obscure a second portion of the first screen needed to follow the instructions.

15. The system of claim 14, comprising instructions to:
present the representation of the first screen associated with the first UE on a second screen associated with the second device;
create a first overlay associated with the first screen and a second overlay associated with the second screen,
wherein the first overlay includes a first transparent image fitted over the first screen,
wherein the second overlay includes a second transparent image fitted over the second screen, and
wherein the second overlay is configured to receive an input from a second user;
receive from the second user the input,
wherein the input includes a visual or an alphanumeric input;
present the input in the second overlay associated with the second screen,
wherein the input is visible on top of the second screen; and
send the input to the first UE configured to present the input in the first overlay associated with the first screen.

16. The system of claim 14, comprising instructions to:
receive an indication of time during which to share the representation of the first screen associated with the first UE;
obtain a current time;
determine whether the current time is outside the indication of time during which to share the representation;
upon determining that the current time is within the indication of time during which to share the representation, cause the first UE to send the representation of the first screen associated with the first UE to the second device; and
upon determining that the current time is outside the indication of time during which to share the representation, cause the first UE to refrain from sending the representation of the first screen associated with the first UE.

17. The system of claim 14, comprising instructions to:
cause the first UE to present the visual representation on a first portion of the first screen;
cause the first UE to receive a second input from the first user indicating to relocate the visual representation; and
cause the first UE to relocate the visual representation based on the second input from the first user.

18. The system of claim 14, comprising instructions to:
analyze the representation of the first screen associated with the first UE by:
retrieving from a database multiple screens and multiple solutions,
wherein a screen among the multiple screens is associated with a solution among the multiple solutions; and
identifying among the multiple screens a third screen that is most similar to the first screen;
identify a third solution associated with the third screen; and
provide the third solution to the first UE.

19. The system of claim 14, comprising instructions to:
receive an indication that the technical issue has been resolved and an indication of a solution of the technical issue; and
store the indication of the solution of the technical issue and at least one of the first screen or the second screen.

* * * * *